US 11,745,805 B2

(12) United States Patent
Wraith et al.

(10) Patent No.: US 11,745,805 B2
(45) Date of Patent: Sep. 5, 2023

(54) TRAIL SIGHT

(71) Applicant: Ford Global Technologies, LLC, Dearborn, MI (US)

(72) Inventors: Paul Jonathan Alexander Wraith, West Bloomfield, MI (US); Dong Hoon Park, Canton, MI (US); Todd Bucher, Brownstown, MI (US); James Antime Marleau, Jr., Canton, MI (US); Martin B. Coons, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 144 days.

(21) Appl. No.: 17/392,753

(22) Filed: Aug. 3, 2021

(65) Prior Publication Data

US 2023/0042656 A1   Feb. 9, 2023

(51) Int. Cl.
*B62D 25/12* (2006.01)
*B60R 9/00* (2006.01)
*B60R 11/00* (2006.01)
*B60P 7/08* (2006.01)

(52) U.S. Cl.
CPC .............. *B62D 25/12* (2013.01); *B60R 11/00* (2013.01); *B60P 7/0807* (2013.01); *B60R 9/00* (2013.01); *B60R 2011/004* (2013.01); *B60R 2011/0066* (2013.01)

(58) Field of Classification Search
CPC ...... B62D 25/08; B62D 25/085; B62D 25/12; B62D 65/02; B62D 65/08; B60P 7/00; B60P 7/0807; B60P 3/079; B60R 9/00; B60R 9/06; B60R 11/00; B60R 2011/004; B60R 2011/0042; B60R 2011/0049; B60R 2011/0052; B60R 2011/0066; B60R 13/00; B60R 2013/016; B60R 1/06
USPC ................ 296/1.07, 193.09, 193.11, 203.01; 410/106, 110; 343/713, 715
See application file for complete search history.

(56) References Cited

U.S. PATENT DOCUMENTS

| | | | | |
|---|---|---|---|---|
| 3,126,858 A | * | 3/1964 | Rosinski | ............... B63B 21/045 138/122 |
| 3,420,490 A | * | 1/1969 | Malachowski | ......... B60R 1/078 248/486 |
| 3,778,016 A | * | 12/1973 | Gernhardt | ............... B60R 1/078 D12/187 |
| 4,079,519 A | | 3/1978 | Carmouche | |
| 4,288,188 A | * | 9/1981 | Smith | ..................... B60R 9/048 410/97 |

(Continued)

OTHER PUBLICATIONS

Auto Hypersonic "Corner Pole Safety Guard for Car Hypersonic HP6623", Apr. 12, 2016.

*Primary Examiner* — Dennis H Pedder
*Assistant Examiner* — Joyce Eileen Hill
(74) *Attorney, Agent, or Firm* — Vichit Chea; Carlson, Gaskey & Olds, P.C.

(57) ABSTRACT

A trail sight, according to an exemplary aspect of the present disclosure includes, among other things, a body configured to extend in a longitudinal direction along a length of a vehicle, at least one first attachment interface associated with the body, and at least one second attachment interface associated with the body. The at least one first attachment interface is used to mount the body to a vehicle structure. The at least one second attachment interface is configurable to provide an accessory mount interface and/or a tie down mount interface.

24 Claims, 1 Drawing Sheet

(56) References Cited

U.S. PATENT DOCUMENTS

| | | | |
|---|---|---|---|
| 5,328,067 A * | 7/1994 | Lalush | B60R 9/00 224/325 |
| 6,412,675 B1 * | 7/2002 | Pope | B60R 9/02 224/325 |
| 7,543,545 B2 | 6/2009 | Matsumoto et al. | |
| 9,688,187 B1 | 6/2017 | Conrad | |
| 10,759,330 B1 | 9/2020 | Salter et al. | |
| 2006/0071493 A1 | 4/2006 | Ganz | |
| 2008/0253006 A1 * | 10/2008 | Englander | G11B 5/4826 |
| 2009/0127016 A1 * | 5/2009 | Hayashi | B60R 21/36 180/274 |
| 2020/0377025 A1 | 12/2020 | Salter et al. | |
| 2020/0377028 A1 | 12/2020 | Salter et al. | |
| 2021/0094460 A1 | 4/2021 | Beilman et al. | |

\* cited by examiner

TRAIL SIGHT

TECHNICAL FIELD

This disclosure relates generally to a trail sight for a vehicle.

BACKGROUND

Vehicles can include a trail sight that is mounted near a front of the vehicle. The trail sight is typically visible from a driver's position and is designed to guide the driver along a vehicle path and/or to aid the drive in detecting the vehicle's boundaries.

SUMMARY

A trail sight according to an exemplary aspect of the present disclosure includes, among other things, a body configured to extend in a longitudinal direction along a length of a vehicle, at least one first attachment interface associated with the body to mount the body to a vehicle structure, and at least one second attachment interface associated with the body, the at least one second attachment interface being configurable to provide an accessory mount interface and/or a tie down mount interface.

In a further non-limiting embodiment of the foregoing trail sight, the at least one first attachment interface is configured to hold the body fixed to a vehicle structure.

In a further non-limiting embodiment of any of the foregoing trail sights, the at least one first attachment interface comprises at least one mounting flange extending outward of the body in a lateral direction transverse to the longitudinal direction.

In a further non-limiting embodiment of any of the foregoing trail sights, the body has a length extending in the longitudinal direction, a width extending in a lateral direction, and a height extending in a vertical direction, and wherein the body has a first side and a second side opposite the first side, the first and second sides extending in the longitudinal direction and being connected to each other via a top edge and a bottom edge, and wherein the length is greater than the width and the height.

In a further non-limiting embodiment of any of the foregoing trail sights, a thickness of the body is defined as extending from the first side and to the second side, and wherein the at least one second attachment interface comprises at least one opening formed to extend through an entirety of the thickness.

In a further non-limiting embodiment of any of the foregoing trail sights, the at least one opening comprises at least two openings extending through the entirety of the thickness, the two openings being spaced apart from each other and each configured to receive a fastener to mount an accessory.

In a further non-limiting embodiment of any of the foregoing trail sights, the at least one opening comprises a single elongated opening having a length greater than a height, the single elongated opening comprising the tie down mount interface.

In a further non-limiting embodiment of any of the foregoing trail sights, a removable insert fits within and substantially fills the single elongated opening, and wherein the removable insert includes one or more apertures to provide the accessory mount interface.

In a further non-limiting embodiment of any of the foregoing trail sights, the height varies along the length of the body.

In a further non-limiting embodiment of any of the foregoing trail sights, the at least one second attachment interface provides both the accessory mount interface and the tie down mount interface.

A vehicle, according to yet another exemplary aspect of the present disclosure includes, among other things, a hood, a fender positioned on one side of the hood and spaced from the hood by a gap, and a trail sight body positioned within the gap and extending in a longitudinal direction along a length of the vehicle. The trail sight body includes at least one first attachment interface to hold the trail sight body fixed relative to the hood and at least one second attachment interface that is configurable to provide an accessory mount interface and/or a tie down mount interface.

In a further non-limiting embodiment of the foregoing vehicle, the gap has a first portion with a first width at a front of the hood and a second portion with a second width that is less than the first width at a rear of the hood, and wherein the trail sight body is positioned within the first portion of the gap and extends vertically above the hood.

In a further non-limiting embodiment of any of the foregoing vehicles, the gap has a transition portion with a transition surface that connects the first portion to the second portion of the gap, and wherein the transition surface provides an inclined surface that faces a rear end of the trail sight body to provide a rearward locating surface, and wherein a front end of the trail sight body is at a forward open end of the gap to allow adjustability of a longitudinal position of the trail sight body within the gap.

In a further non-limiting embodiment of any of the foregoing vehicles, the trail sight body has a length extending in the longitudinal direction, a width extending in a lateral direction, and a height extending in a vertical direction, and wherein the trail sight body has a first side and a second side opposite the first side, the first and second sides extending in the longitudinal direction and being connected to each other via a top edge and a bottom edge, and wherein the length is greater than the width and the height, and wherein the height varies along the length.

In a further non-limiting embodiment of any of the foregoing vehicles, a thickness of the trail sight body is defined as extending from the first side and to the second side, and wherein the at least one second attachment interface comprises at least one opening formed to extend through an entirety of the thickness.

In a further non-limiting embodiment of any of the foregoing vehicles, the at least one opening comprises at least two openings extending through the entirety of the thickness, the two openings being spaced apart from each other and each configured to receive a fastener to mount an accessory, and optionally, including a second trail sight body to attach an accessory or to serve as an additional tie down.

In a further non-limiting embodiment of any of the foregoing vehicles, the at least one opening comprises a single elongated opening having a length greater than a height, the single elongated opening comprising the tie down mount interface.

In a further non-limiting embodiment of any of the foregoing vehicles, a removable insert fits within and substantially fills the single elongated opening, and wherein the removable insert includes one or more apertures to provide the accessory mount interface.

In a further non-limiting embodiment of any of the foregoing vehicles, the at least one first attachment interface comprises at least one mounting flange extending away from the trail sight body and which is configured to hold the body fixed to a vehicle structure.

In a further non-limiting embodiment of any of the foregoing vehicles, the hood comprises a main portion and a forward portion that extends in a downward direction away from the main portion, and wherein the trail sight body includes a rearward portion extending vertically above the main portion of the hood and a forward portion that decreases in height from the rearward portion to blend into the forward portion of the hood.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details an exemplary vehicle with a trail sight. The trail sight is located near a front of the vehicle to be visible from a driver's position, and the trail sight is designed to guide the driver along a vehicle path and/or to aid the driver in detecting the vehicle's boundaries.

Figure 1:
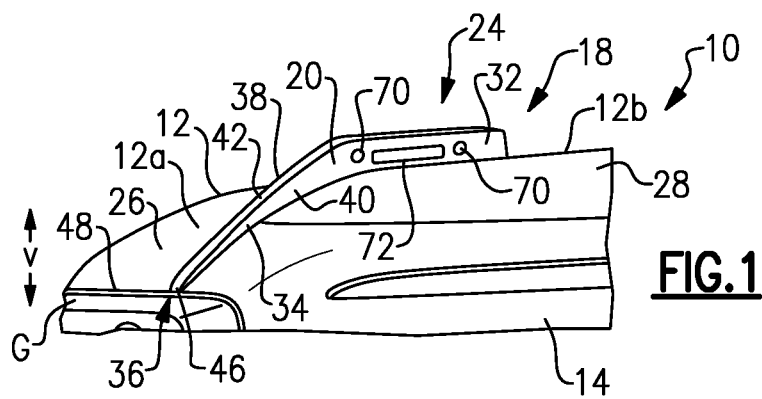
FIG. 1 illustrates a perspective view of a front of a vehicle with a trail sight that is positioned to extend in a longitudinal direction along a vehicle hood.

FIG. 1 shows a vehicle 10 that includes a hood 12 and a fender 14 that is positioned on one side of the hood 12. A front grill G is positioned on a front of the vehicle and is spaced apart from a front edge of the hood. The fender 14 is spaced from the hood 12 by a gap 16. A trail sight 18 is positioned within the gap 16 and extends in a longitudinal direction along a length of the vehicle 10. Another trail sight 18 could also be located in a similar position on the opposite side of the hood 12. The trail sight 18 comprises an elongated body 20 that includes at least one first attachment interface 22 (FIG. 3) to mount the body 20 to a vehicle structure and at least one second attachment interface 24 (FIG. 1) that is configurable to provide an accessory mount interface and/or a tie down mount interface.

The gap 16 has a first portion 16a with first width W1 at a front 26 of the hood 12 and a second portion 16b with a second width W2 that is less than the first width W1 at a rear 28 of the hood 12. The trail sight body 20 is positioned within the first portion 16a of the gap 16 and extends vertically above the hood 12 as shown in FIG. 1. The gap 16 has a transition portion 16c with a transition surface 30 that connects the hood surface defining the first portion 16a of the gap to the hood surface defining the second portion 16b of the gap. In one example, the transition surface 30 provides an inclined surface on the hood 12 that faces a rear end 32 of the trail sight body 20 to provide a rearward locating/reference surface. A front end 34 of the trail sight body 20 is at a forward open end 36 of the gap 16 to allow adjustability of a longitudinal position of the trail sight body 20 within the gap 16. The entire trail sight body 20 can also be adjusted vertically within the gap 16. This adjustability in multiple directions accounts for any manufacturing/tolerancing issues and ensures that the trail sight 18 is in the correct desired position relative to the hood 12.

Figure 2:
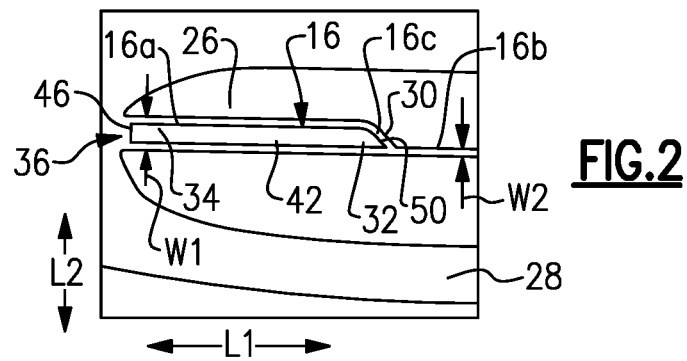
FIG. 2 is a top view of FIG. 2.

As shown in FIG. 2, the body 20 of the trail sight 18 extends in a longitudinal direction L1 along a length of a vehicle. As such, the body 20 has a length extending in the longitudinal direction L1, a width extending in a lateral direction L2, and a height extending in a vertical direction V (FIG. 1). The body 20 further has a first side 38 and a second side 40 opposite the first side 38. The first 38 and second 40 sides extend in the longitudinal direction L1 and are connected to each other via a top edge 42 and a bottom edge 44. A thickness of the body 20 is defined as extending from the first side 28 and to the second side 40.

In one example, the length of the body 20 is greater than the width and the height of the body 20.

In one example, the height varies along a length of the body 20. In one example, the height at the front end 34 of the body 20 is less than a height at the rear end 32 of the body 20.

In one example, a forward facing edge surface 46 of the body 20 is a straight surface or planar surface that is flush with a front edge 48 of the hood 12.

In one example, a rearward facing edge surface 50 of the body 20 is an inclined surface that generally matches the inclination of the transition surface 30 on the hood 12 that forms the transition portion 16c of the gap 16. This transition surface 30 defines the maximum reward position of the trail sight 18 once installed within the gap 16.

In one example, the hood 12 comprises a main portion 12a and a forward portion 12b that extends in a downward direction away from the main portion 12a. In one example, the forward portion 12b comprises a curved surface that provides for aerodynamic flow. In one example, the trail sight body 20 includes a first portion 56 extending vertically above the main portion 12a of the hood 12 and a second portion 58 that decreases in height from the first portion 56 to blend into the forward portion 12b of the hood 12.

Figure 3:
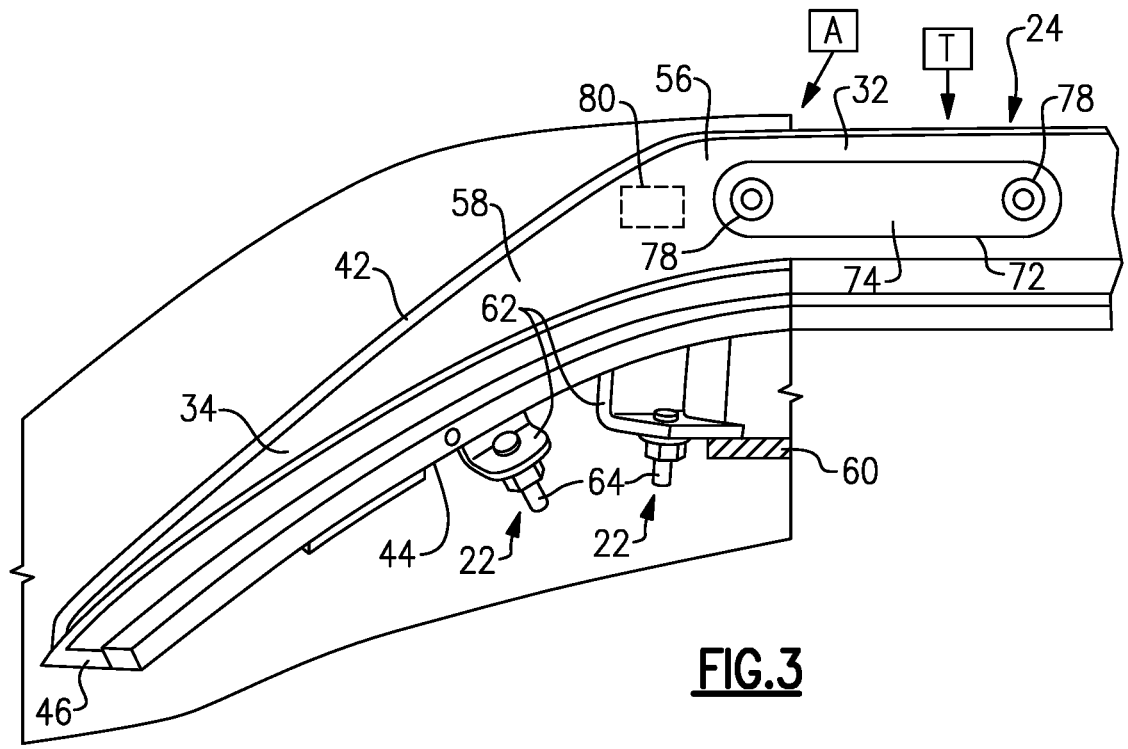
FIG. 3 is a perspective side view of the trail sight of FIG. 1.

In one example shown in FIG. 3, the at least one first attachment interface 22 is associated with the bottom edge 44 of the body 20 and is used to mount the body 20 to a vehicle structure 60. The first attachment interface 22 is configured to hold the body 20 fixed to the vehicle structure 60, e.g. the trail sight 18 is held in a fixed position and does not move relative to the hood 12 or fender 14. In one example, the first attachment interface 22 further comprises at least one mounting flange 62 extending outward of the body 20 in the lateral direction L2 transverse to the longitudinal direction L1.

In one example, the first attachment interface 22 comprises one or more fasteners 64 that mount the body 20 to the vehicle structure 60. In one example, there is a mounting flange 62 for each fastener 64. In one example with multiple fasteners 64, the fasteners 64 are axially spaced apart from each other along the length of the body 20. In one example, the fasteners 64 each comprise a nut and an associated bolt; however, other types of fasteners or attachment interfaces could also be used.

In one example, the first attachment interface 22 is positioned along a more rearward portion of the body 20 of the trail sight 18 to provide improved stability.

In one example, the at least one second attachment interface 24 is formed within a rearward portion of the body 20. The second attachment interface 24 is configurable in a variety of different ways to provide an accessory mount interface and/or a tie down mount interface. In one example, the second attachment interface 24 comprises at least one opening 70 formed to extend through an entirety of the thickness of the body 20. The opening 70 can be used to mount an accessory A (FIG. 3) such as a camera, light, etc., or can serve as a tie-down area T (FIG. 3) to receive a rope or strap attachment, for example. In another example, the at least one opening 70 comprises two or more openings 70 extending through the entirety of the thickness of the body 20. The two openings 70 are spaced apart from each other and each are configured to receive a fastener to mount an accessory A, or can serve as an opening for a tie-down structure T. Optionally, two or more trail sights 18 could be used together at the same time to attach an accessory or to support other items.

In another example, the second attachment interface 24 comprises at least one opening 72 formed to extend through an entirety of the thickness of the body 20, where the at least one opening 72 comprises a single elongated opening (FIG. 1) having a length greater than a height. In this example, the single elongated opening 72 comprises a tie down mount interface.

In one example, a removable insert 74 (FIG. 3) fits within and substantially fills the single elongated opening 72. In one example, the removable insert 74 includes one or more openings/apertures 78 that extend through a thickness of the removable insert 74. The additional apertures 78 provide the accessory mount interface. Thus, the at least one second attachment interface 24 provides a beneficial configuration that provides both an accessory mount interface and a tie down mount interface.

In one example, the trail sight 18 includes an information area 80 that is formed on at least one of the first 38 and second 40 sides of the body. In one example, the information area 80 includes a flat surface with raised text and/or figures. In one example, the information area 80 includes information such as a load rating.

In one example, the trail sight 18 comprises a metal plate with overmolded reinforced nylon; however, other materials could also be used.

The disclosure provides a trail sight 18 that allows the driver to be spatially aware of the edge of the vehicle and provides guidance to the path needed to maneuver around or pass objects. This is specifically helpful when the front of the vehicle is sloped downward and out of sight of the driver. The disclosed trail 18 is useful for both on-road and on-trail situations. The trail sight 18 is thus located at the front of the vehicle and can be mounted to the hood, fender, bumper, cowl, grill, etc. The disclosed trail sight 18 additionally provides a re-configurable attachment interface that can be used to mount one or more accessories and/or provide a tie down mount structure.

Although a specific component relationship is illustrated in the figures of this disclosure, the illustrations are not intended to limit this disclosure. In other words, the placement and orientation of the various components shown could vary within the scope of this disclosure. In addition, the various figures accompanying this disclosure are not necessarily to scale, and some features may be exaggerated or minimized to show certain details of a particular component.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A trail sight for a vehicle, comprising:
   a body configured to extend in a longitudinal direction along a length of a vehicle;
   at least one first attachment interface associated with the body to mount the body to a vehicle structure to provide a trail sight; and
   at least one second attachment interface associated with the body, the at least one second attachment interface including a removable portion to provide the body with different mounting configurations including at least an accessory mount interface and a tie down mount interface.

2. The trail sight according to claim 1, wherein the at least one first attachment interface is configured to hold the body fixed to a vehicle structure.

3. The trail sight according to claim 1, wherein the at least one first attachment interface comprises at least one mounting flange extending outward of the body in a lateral direction transverse to the longitudinal direction.

4. The trail sight according to claim 1, wherein the body has a length extending in the longitudinal direction, a width extending in a lateral direction, and a height extending in a vertical direction, and wherein the body has a first side and a second side opposite the first side, the first and second sides extending in the longitudinal direction and being connected to each other via a top edge and a bottom edge, and wherein the length is greater than the width and the height.

5. The trail sight according to claim 4, wherein a thickness of the body is defined as extending from the first side to the second side, and wherein the at least one second attachment interface comprises at least one opening formed to extend through an entirety of the thickness.

6. The trail sight according to claim 5, wherein the at least one opening comprises at least two openings extending through the entirety of the thickness, the two openings being spaced apart from each other and each configured to receive a fastener to mount an accessory.

7. The trail sight according to claim 5, wherein the at least one opening comprises a single elongated opening having a length greater than a height, the single elongated opening comprising the tie down mount interface.

8. The trail sight according to claim 4, wherein the height varies along the length of the body.

9. The trail sight according to claim 1, wherein the at least one second attachment interface provides both the accessory mount interface and the tie down mount interface, and wherein the trail sight includes an information area formed on the body.

10. The trail sight according to claim 1, wherein:
    the body is positionable within a gap of a vehicle hood and has a forward facing surface and a rearward facing surface that are spaced apart from each other in the longitudinal direction;
    the body is adjustable vertically and longitudinally within the gap to ensure that the body is in a desired position relative to the vehicle hood; and
    the at least one first attachment interface is associated with the body to mount the body to a vehicle structure to provide the trail sight in the desired position near a front of the vehicle and visible from a driver's position.

11. The trail sight according to claim 10, wherein the forward facing surface of the body is configured to be at a forward open end of the gap to allow adjustability of the body in the longitudinal direction, and wherein the rearward facing surface of the body comprises an inclined surface that matches an inclined surface in the gap to define a maximum reward longitudinal position of the trail sight.

12. The trail sight according to claim 1, wherein the at least one second attachment interface comprises at least one opening formed to extend through an entirety of a thickness of the body, and wherein the removable portion is received within the at least one opening to provide one type of mounting configuration and is selectively removed from the at least one opening to provide a different type of mounting configuration.

13. A trail sight for a vehicle, comprising:
a body configured to extend in a longitudinal direction along a length of a vehicle, wherein the body has a length extending in the longitudinal direction, a width extending in a lateral direction, and a height extending in a vertical direction, and wherein the body has a first side and a second side opposite the first side, the first and second sides extending in the longitudinal direction and being connected to each other via a top edge and a bottom edge, and wherein the length is greater than the width and the height;
at least one first attachment interface associated with the body to mount the body to a vehicle structure;
at least one second attachment interface associated with the body, the at least one second attachment interface being configurable to provide an accessory mount interface and/or a tie down mount interface;
wherein a thickness of the body is defined as extending from the first side to the second side, and wherein the at least one second attachment interface comprises at least one opening formed to extend through an entirety of the thickness;
wherein the at least one opening comprises a single elongated opening having a length greater than a height, the single elongated opening comprising the tie down mount interface; and
a removable insert that fits within and substantially fills the single elongated opening, and wherein the removable insert includes one or more apertures to provide the accessory mount interface.

14. A vehicle comprising:
a hood;
a fender positioned on one side of the hood and spaced from the hood by a gap; and
a trail sight body positioned within the gap and extending in a longitudinal direction along a length of the vehicle, wherein the trail sight body has a forward facing surface and a rearward facing surface that are spaced apart from each other in the longitudinal direction, the forward facing surface is at a forward open end of the gap to allow adjustability of a longitudinal position of the trail sight body within the gap, the rearward facing surface comprises an inclined surface that is configured to match an inclined surface in the gap to define a maximum reward position of the trail sight body once installed within the gap, and wherein the trail sight body is adjustable vertically within the gap to ensure that the trail sight body is in a desired position relative to the hood;
wherein the trail sight body includes at least one first attachment interface to hold the trail sight body fixed relative to the hood to provide a trail sight that is in the desired position near a front of the vehicle and visible from a driver's position; and
at least one second attachment interface that is configurable to provide an accessory mount interface and/or a tie down mount interface.

15. The vehicle according to claim 14, wherein the gap has a first portion with a first width at a front of the hood and a second portion with a second width that is less than the first width at a rear of the hood, and wherein the trail sight body is positioned within the first portion of the gap and extends vertically above the hood.

16. The vehicle according to claim 15, wherein the gap has a transition portion with a transition surface that connects the first portion to the second portion of the gap, and wherein the transition surface provides the inclined surface that faces a rear end of the trail sight body to provide a rearward locating surface, and wherein a front end of the trail sight body is at the forward open end of the gap to allow adjustability of the longitudinal position of the trail sight body within the gap.

17. The vehicle according to claim 14, wherein the trail sight body has a length extending in the longitudinal direction, a width extending in a lateral direction, and a height extending in a vertical direction, and wherein the trail sight body has a first side and a second side opposite the first side, the first and second sides extending in the longitudinal direction and being connected to each other via a top edge and a bottom edge, and wherein the length is greater than the width and the height, and wherein the height varies along the length.

18. The vehicle according to claim 17, wherein a thickness of the trail sight body is defined as extending from the first side to the second side, and wherein the at least one second attachment interface comprises at least one opening formed to extend through an entirety of the thickness.

19. The vehicle according to claim 18, wherein the at least one opening comprises at least two openings extending through the entirety of the thickness, the two openings being spaced apart from each other and each configured to receive a fastener to mount an accessory, and optionally, including a second trail sight body to attach an accessory or to serve as an additional tie down.

20. The vehicle according to claim 18, wherein the at least one opening comprises a single elongated opening having a length greater than a height, the single elongated opening comprising the tie down mount interface.

21. The vehicle according to claim 14, wherein the at least one first attachment interface comprises at least one mounting flange extending away from the trail sight body and which is configured to hold the body fixed to a vehicle structure.

22. The vehicle according to claim 14, wherein the hood comprises a main portion and a forward portion that extends in a downward direction away from the main portion, and wherein the trail sight body includes a rearward portion extending vertically above the main portion of the hood and a forward portion that decreases in height from the rearward portion to blend into the forward portion of the hood.

23. The vehicle according to claim 14, wherein the trail sight includes an information area formed on the trail sight body as a textured surface.

24. A vehicle comprising:
a hood;
a fender positioned on one side of the hood and spaced from the hood by a gap; and
a trail sight body positioned within the gap and extending in a longitudinal direction along a length of the vehicle, wherein the trail sight body has a length extending in the longitudinal direction, a width extending in a lateral direction, and a height extending in a vertical direction, and wherein the trail sight body has a first side and a second side opposite the first side, the first and second sides extending in the longitudinal direction and being connected to each other via a top edge and a bottom edge, and wherein the length is greater than the width and the height, and wherein the height varies along the length;

wherein the trail sight body includes at least one first attachment interface to hold the trail sight body fixed relative to the hood and at least one second attachment interface that is configurable to provide an accessory mount interface and/or a tie down mount interface;

wherein a thickness of the trail sight body is defined as extending from the first side and to the second side, and wherein the at least one second attachment interface comprises at least one opening formed to extend through an entirety of the thickness;

wherein the at least one opening comprises a single elongated opening having a length greater than a height, the single elongated opening comprising the tie down mount interface; and a removable insert that fits within and substantially fills the single elongated opening, and wherein the removable insert includes one or more apertures to provide the accessory mount interface.

\* \* \* \* \*